(12) United States Patent
Matic et al.

(10) Patent No.: US 8,175,389 B2
(45) Date of Patent: May 8, 2012

(54) RECOGNIZING HANDWRITTEN WORDS

(75) Inventors: Nada P. Matic, Santa Clara, CA (US);
Yi-Hsun E. Cheng, Sunnyvale, CA (US)

(73) Assignee: Synaptics Incorporated, Santa Clara, CA (US)

( * ) Notice: Subject to any disclaimer, the term of this patent is extended or adjusted under 35 U.S.C. 154(b) by 614 days.

(21) Appl. No.: 12/413,875

(22) Filed: Mar. 30, 2009

(65) Prior Publication Data

US 2010/0246964 A1 Sep. 30, 2010

(51) Int. Cl.
*G06K 9/00* (2006.01)
*G06K 9/18* (2006.01)

(52) U.S. Cl. ......................................... 382/187; 382/185

(58) Field of Classification Search ................... 382/185, 382/186, 187
See application file for complete search history.

(56) References Cited

U.S. PATENT DOCUMENTS

| | | | |
|---|---|---|---|
| 5,105,468 A | 4/1992 | Guyon et al. | |
| 5,649,068 A | 7/1997 | Boser et al. | |
| 5,730,165 A | 3/1998 | Philipp | |
| 5,861,583 A | 1/1999 | Schediwy et al. | |
| 5,926,566 A | 7/1999 | Wang et al. | |
| 6,094,506 A * | 7/2000 | Hullender ..................... | 382/186 |
| 7,496,547 B2 | 2/2009 | Abdulkader et al. | |
| 7,885,464 B2 * | 2/2011 | Kawamura et al. ........... | 382/186 |
| 2002/0071607 A1 | 6/2002 | Kawamura et al. | |
| 2008/0260252 A1 | 10/2008 | Borgaonkar et al. | |

FOREIGN PATENT DOCUMENTS

| | | |
|---|---|---|
| JP | 58169296 A | 10/1983 |
| JP | 5233599 A | 9/1993 |
| JP | 7182446 A | 7/1995 |
| JP | 2001184458 A | 7/2001 |
| WO | WO-2006/090404 | 8/2006 |

OTHER PUBLICATIONS

"Secrets of Successful Qtouch Design", *Quantum Research Application Note AN-KD02*, (Oct. 2005),1-11.
Shimodaira, Hiroshi et al., "On-line Overlaid-Handwriting Recognition Based on Substroke HMMs", *Proceedings of the Seventh International Conference on Document Analysis and Recognition*, (Jan. 2003),1-5.
Miayazato, JP Office Action, Application No. P2009-518279, 3 pages, Feb. 21, 2012.

* cited by examiner

*Primary Examiner* — John Strege

(57) ABSTRACT

Recognizing handwritten words at an electronic device. A plurality of strokes is received at a common input region of an electronic device. The plurality of strokes in combination defines a word comprising a plurality of symbols, a relative geometry of a first subset of the plurality of strokes defines a first symbol and a relative geometry of a second subset of the plurality of strokes defines a second symbol such that the relative geometry of the first subset of the plurality of strokes is not related to the relative geometry of the second subset of the plurality of strokes, and at least one stroke of the first subset of the plurality of strokes is spatially superimposed over at least one stroke of the second subset of the plurality of strokes. The word is determined using a processor of the electronic device based on the plurality of strokes without requiring recognition of the plurality of symbols, wherein a word is determined based at least in part on an entry sequence of subsets of the plurality of strokes.

23 Claims, 6 Drawing Sheets

150

300

```
A plurality of strokes is received at a common input region of an
electronic device, wherein the plurality of strokes in combination
defines a word comprising a plurality of symbols, a relative
geometry of a first subset of the plurality of strokes defines a first
symbol and a relative geometry of a second subset of the plurality
of strokes defines a second symbol such that the relative geometry
of the first subset of the plurality of strokes is not related to the
relative geometry of the second subset of the plurality of strokes,
and at least one stroke of the first subset of the plurality of strokes
is spatially superimposed over at least one stroke of the second
subset of the plurality of strokes
310
```

↓

```
The word is determined based on the plurality of strokes
without requiring recognition of the plurality of symbols,
wherein a word is determined based at least in part on an
entry sequence of subsets of the plurality of strokes
320

The plurality of strokes are inputted into a
    preprocessor
    330
            ↓
    The preprocessed plurality of strokes are inputted
    into a statistical classifier trained to identify the word.
    340
            ↓
    An output of the statistical classifier is indexed to at
    least one dictionary for determining word.
    350
```

A plurality of strokes is received at a common input region of an electronic device, wherein the plurality of strokes in combination defines a word comprising a plurality of symbols, a relative geometry of a first subset of the plurality of strokes defines a first symbol and a relative geometry of a second subset of the plurality of strokes defines a second symbol such that the relative geometry of the first subset of the plurality of strokes is not related to the relative geometry of the second subset of the plurality of strokes, and at least one stroke of the first subset of the plurality of strokes is spatially superimposed over at least one stroke of the second subset of the plurality of strokes
510

The Pinyin representation is determined by the corresponding output of the statistical classifier having the highest score, where the output scores indicate a probability that the word feature vector analyzed by the statistical classifier are a particular word from the Pinyin representation dictionary
520

The plurality of strokes are inputted into a preprocessor and transformed into a word feature vector
530

The transformed feature vector is inputted to a statistical classifier trained to associate the transformed word feature vector with a target word in the Pinyin representation dictionary
540

The candidate list of Chinese ideograms is also determined based on the same output pin of the statistical classifier trained to associate the Pinyin representation and the transformed word feature vector of the input stroke sequence
550

FIG. 5

RECOGNIZING HANDWRITTEN WORDS

FIELD

Embodiments of the present invention generally relates to the field of recognition of handwritten words.

BACKGROUND

Recent technological advances have led to the increased prevalence of many small electronic devices, such as mobile phones, that include handwriting symbol entry functionality. However, these small devices typically have input devices with small symbol input areas. Often these input devices only have enough space for a user to write a single symbol. On these input devices, symbols cannot be written in the natural order (e.g., side-by-side and left-to-right) that is natural to many languages. These input devices require that symbols be written on top of each other.

Due to symbols being written on top of each other, the segmentation of symbols entered using small input devices adds additional complexity to the symbol input systems described above. Current solutions do exist for handwriting recognition on small input devices. However, in order to address the complex symbol segmentation problem, these current solutions provide users with unnatural symbol entry or have reduced accuracy.

For example, some small input devices require users to learn special alphabets, such as a unistroke alphabet. A unistroke alphabet is designed such that each symbol is a single stroke. Thus, while symbol segmentation is easily addressed, a user is forced to learn an unnatural and distorted alphabet. Other small input devices use a timeout mechanism or other external segmenting signal to address the symbol segmentation problem. A user is required to pause after the entry of a symbol. Once the timeout occurs, the symbol recognition is performed. This technique is also unnatural as it requires a user to wait for a timeout after each symbol is entered. Furthermore, it is error-prone, as a user may not enter strokes fast enough, causing a timeout to occur before the user is finished with entering the symbol, resulting in an incorrectly identified symbol. Furthermore, the use of external segmenting signals, e.g., pressing a button to indicate the end of a symbol, is also error prone and awkward.

Many devices capable of handwriting recognition use a segmentation preprocessor to segment a word into tentative symbols that are then passed to a handwriting recognition engine capable of recognizing symbols from a particular alphabet. This process introduces segmentation error in addition to symbol recognition error. Further, many of these devices have small handwriting input device that can make it difficult to perform accurate segmentation where symbols can be written on top of each other. This process can result with unacceptable levels of error.

SUMMARY

Various embodiments of the present invention, recognizing handwritten words, are described herein. A plurality of strokes is received at a common input region of an electronic device. The plurality of strokes in combination defines a word comprising a plurality of symbols, a relative geometry of a first subset of the plurality of strokes defines a first symbol and a relative geometry of a second subset of the plurality of strokes defines a second symbol such that the relative geometry of the first subset of the plurality of strokes is not related to the relative geometry of the second subset of the plurality of strokes, and at least one stroke of the first subset of the plurality of strokes is spatially superimposed over at least one stroke of the second subset of the plurality of strokes. The word is determined using a processor of the electronic device based on the plurality of strokes without requiring recognition of the plurality of symbols, wherein a word is determined based at least in part on an entry sequence of subsets of the plurality of strokes.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 3 is a flowchart diagram illustrating an example process for recognizing handwritten words, in accordance with one embodiment of the present invention.

FIG. 5 is a flowchart diagram illustrating steps in an example process for recognizing handwritten words, in accordance with another embodiment of the present invention.

DESCRIPTION OF EMBODIMENTS

Reference will now be made in detail to the various embodiments of the present invention, examples of which are illustrated in the accompanying drawings. While the invention will be described in conjunction with the various embodiments, it will be understood that they are not intended to limit the invention to these embodiments. On the contrary, the invention is intended to cover alternatives, modifications and equivalents, which may be included within the spirit and scope as defined by the appended claims. Furthermore, in the following description of various embodiments, numerous specific details are set forth in order to provide a thorough understanding of embodiments of the present invention. In other instances, well-known methods, procedures, components, and circuits have not been described in detail so as not to unnecessarily obscure aspects of embodiments of the present invention.

For purposes of the instant description of embodiments, the term "symbol" refers to a minimum set of handwritten strokes intended to convey meaning. For instance, symbols are intended to include, but not be limited to, characters of various alphabets, ideograms for ideographic languages, radicals, phonetic symbols, numerals, mathematical symbols, punctuation symbols, and the like. Moreover, for purposes of the instant description of embodiments, the term "word" refers to a collection of symbols.

Various embodiments of the present invention, recognizing handwritten words, are described herein. In one embodiment, a method for recognizing handwritten words is described. A plurality of strokes is received at a common input region of an electronic device. The plurality of strokes in combination defines a word comprising a plurality of symbols, a relative geometry of a first subset of the plurality of strokes defines a first symbol and a relative geometry of a second subset of the plurality of strokes defines a second symbol such that the relative geometry of the first subset of the plurality of strokes is not related to the relative geometry of the second subset of the plurality of strokes, and at least one stroke of the first subset of the plurality of strokes is spatially superimposed over at least one stroke of the second subset of the plurality of strokes. The word is determined based on the plurality of strokes without requiring recognition of the plurality of symbols, wherein a word is determined based at least in part on an entry sequence of subsets of the plurality of strokes.

Figure 1A:
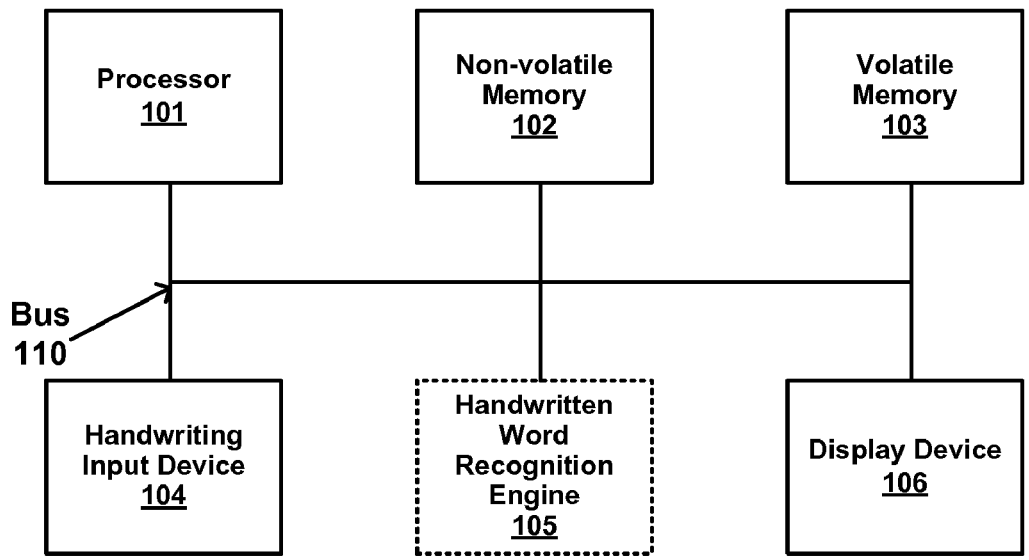
FIG. 1A is a block diagram showing components of an example small form factor device, in accordance with an embodiment of the present invention.

FIG. 1A is a block diagram showing components of an example small form factor electronic device 100, in accordance with an embodiment of the present invention. In general, electronic device 100 comprises bus 110 for communicating information, processor 101 coupled with bus 110 for processing information and instructions, read-only (non-volatile) memory (ROM) 102 coupled with bus 110 for storing static information and instructions for processor 101, and random access (volatile) memory (RAM) 103 coupled with bus 110 for storing information and instructions for processor 101. Electronic device 100 also comprises handwriting input device 104 coupled with bus 110 for receiving stroke input, handwritten word recognition engine 105 coupled with bus 110 for performing handwritten word recognition on received stroke input, and display device 106 coupled with bus 110 for displaying information. It should be appreciated that bus 110 is intended to illustrate that the components of electronic device 100 are communicatively coupled, and that various embodiments of the present invention can be implemented using different configurations of bus 110.

In one embodiment, handwriting input device 104 is operable to receive pen-, stylus-, or finger-based handwritten input from a user. For example, handwriting input device 104 may be a digitizing tablet, a touchpad, an inductive pen tablet, or the like. Handwriting input device 104 is operable to capture geometric information of the input in the form of stroke data, where the geometric information can include coordinate information such as X and Y coordinates. In other words, handwriting input device 104 is a coordinate entry device for detecting in real-time symbol strokes written in the natural stroke order of a symbol and/or word. In one embodiment, the individual words' strokes include positional and temporal information derived from the motion of the object contacting, moving across, and leaving the surface of the handwriting input device 104. In another embodiment, where the handwriting input device 104 is an inductive device placed behind display device 106, the individual word's strokes include positional and temporal information derived from the motion of the object contacting, moving across, and leaving the surface of the display device 106. In one embodiment, strokes are stored in one of non-volatile memory 102 and volatile memory 103, for access by handwritten word recognition engine 105. In one embodiment, the words entered by a user are phonetic representations of an ideographic language. In one embodiment, the phonetic representations of an ideographic language include Pinyin and Bopomofo. In another embodiment, the word entered by a user may be a word of a limited number of words representing a phonetic dictionary. In one embodiment, the symbols are non-cursive.

Figure 1B:
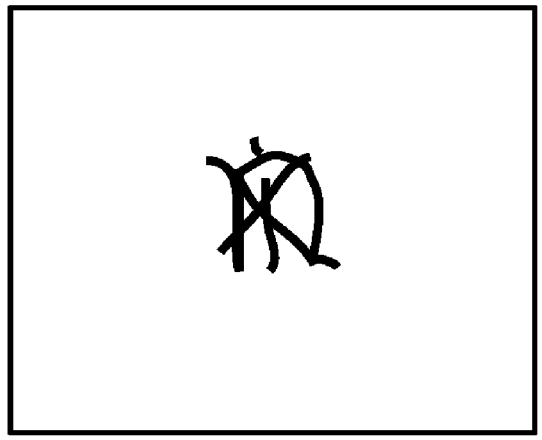
FIG. 1B is a diagram showing the example input of a word using a handwriting input device, in accordance with an embodiment of the present invention.

In one embodiment, handwriting input device 104 is small enough such that symbols of a word input by a user are not written side-by-side (e.g., left to right or top to bottom), but rather on top of one another. For example, in one embodiment, handwriting input device 104 has a surface area of less than one square inch. FIG. 1B is a diagram 150 showing the example input of a word using handwriting input device 104, in accordance with an embodiment of the present invention. Diagram 150 illustrates the input of the example word "xin," where "xin" is a word of the Pinyin dictionary, using a small form factor handwriting input device. In particular, the symbols "x," "i" and "n" are inputted on top of one another. It should be appreciated that embodiments of the present invention are configured to allow input of symbols written side-by-side, for example short words such as "AN" and "TO". In one embodiment, the end of a word is indicated by special gesture, button press, timeout, or other signal.

With reference to FIG. 1A, handwritten word recognition engine 105 is operable to receive strokes input at handwriting input device 104, and performs word recognition on the strokes. It should be appreciated that handwritten word recognition engine 105 may be implemented as hardware, software, firmware, or any combination thereof, within electronic device 100. Moreover, it should be appreciated that handwritten word recognition engine 105, as shown in dotted lines, indicates handwritten word recognition functionality that can be a standalone component or distributed across other components of electronic device 100. For instance, it should be appreciated that different functions of handwritten word recognition engine 105 may be distributed across the components of electronic device 100, such as processor 101, non-volatile memory 102, and volatile memory 103. Operation of handwritten word recognition engine 105 is discussed below, e.g., with reference to FIG. 2. In one embodiment, handwritten word recognition engine 105 is operable to output recognized words. In one embodiment handwritten word recognition engine 105 includes a preprocessor, statistical classifier and at least one dictionary. In one embodiment the number of classes of the statistical classifier is equal to the number of words of the corresponding dictionary.

Display device 106 utilized with electronic device 100 may be a liquid crystal device (LCD) or other display device suitable for creating graphic images and alphanumeric or ideographic symbols recognizable to the user. Display device 106 is operable to display recognized words. In one embodiment, the recognized words are displayed as text.

Figure 2:
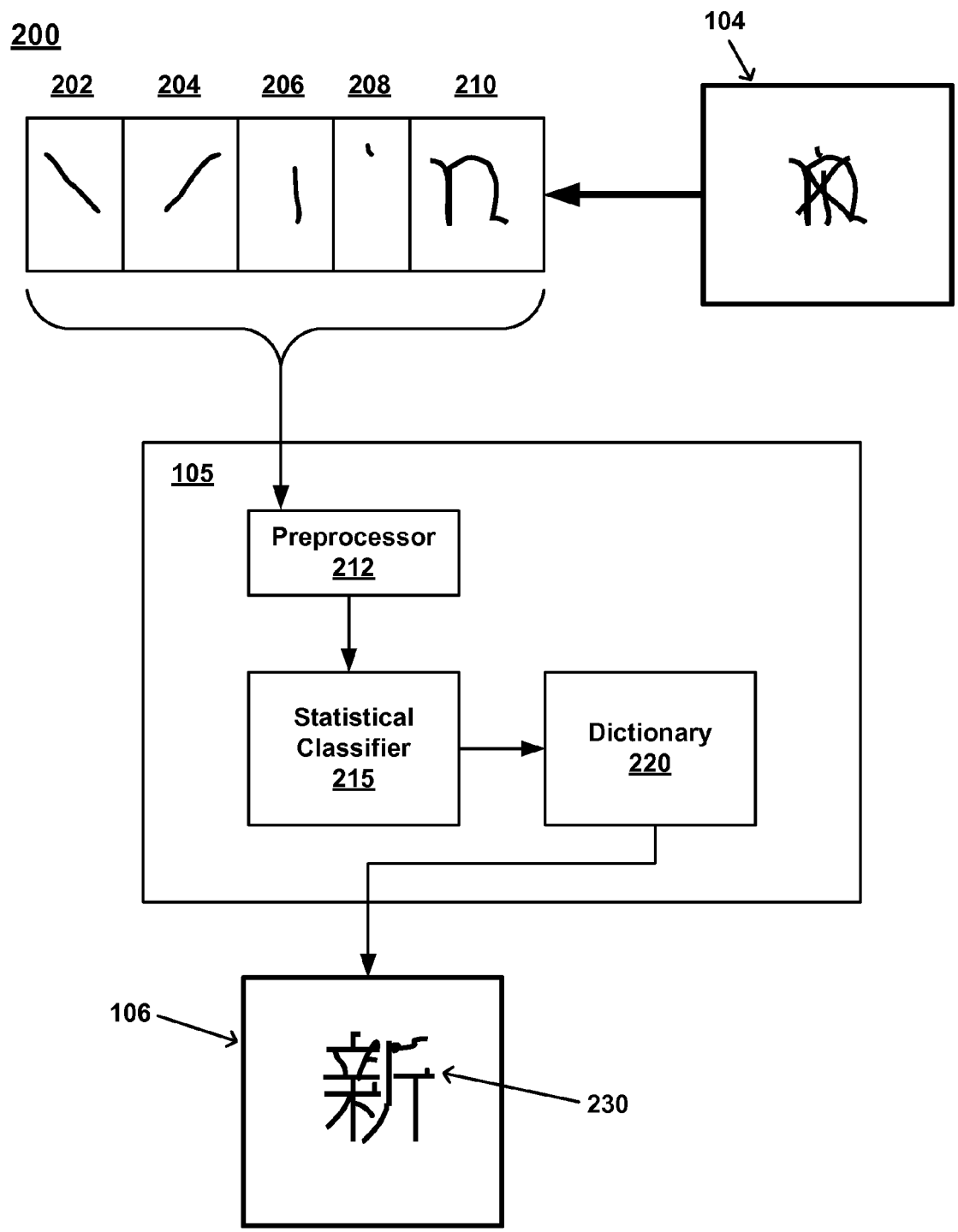
FIG. 2 is a block diagram showing components of an example handwritten word recognition engine, in accordance with one embodiment of the invention.

FIG. 2 is a block diagram showing components of a handwritten word recognition engine, in accordance with one embodiment of the invention. In one embodiment, the present invention provides a system 200 for performing handwritten word recognition based on text entry into a computer device (e.g., electronic device 100 of FIG. 1A) where the area allocated to text entry is small relative to the writing instrument. A user is able to enter strokes of symbols or a word in natural stroke order.

System 200 includes handwriting input device 104, handwritten word recognition engine 105 and display device 106. As described above, stroke input including a plurality of strokes is received at a common input region, e.g., handwriting input device 104. A plurality of strokes in combination defines a word including a plurality of symbols, wherein a relative geometry of a first subset of the plurality of strokes defines a first symbol and a relative geometry of a second subset of the plurality of strokes defines a second symbol such that the relative geometry of the first subset of the plurality of strokes is not related to the relative geometry of the second subset of the plurality of strokes. In one embodiment, at least one stroke of the first subset of the plurality of strokes is spatially superimposed over at least one stroke of the second subset of the plurality of strokes.

In one embodiment, a relative geometry of a stroke includes a relative position and a proportional size of the stroke relative to other strokes of a symbol. In one embodiment, the relative position includes a relative horizontal position and a relative vertical position of the stroke relative to the other strokes of the symbol.

The stroke input is represented in FIG. 2 as strokes 202, 204, 206, 208 and 210. In the present embodiment, the strokes are inputted in the sequence beginning with stroke 202 and ending with stroke 210. As shown, five strokes are processed by handwritten word recognition engine 105. However, it should be appreciated that any number of strokes can be processed, and that embodiments of the present invention are not limited to the present embodiment.

In one embodiment, prior to sending strokes to statistical classifier 215 the strokes are subject to preprocessing at preprocessor 212. Preprocessor 212 is operable to perform various transformations to convert raw data (e.g., X, Y coordinates and/or temporal information) into a representation that facilitates the recognition process. In one embodiment, the preprocessing includes operations such as scaling, word normalization, and word feature vector generation, e.g., converting the input representation into a representation more suitable for the recognition process.

Preprocessing techniques incorporate human knowledge about the task at hand, such as known variances and relevant features. For example, preprocessing can include, but is not limited to, key point extraction, noise filtration and feature extraction. In one embodiment, the output of preprocessor 212 is a vector that represents the word input in the form of a word feature vector defined in multidimensional feature space. This hyperspace is divided into a number of sub-spaces that represent the individual classes of the problem, where each class can be indexed to a word within a predefined dictionary. A classification process determines which subspace feature vectors the particular input belongs.

As shown in FIG. 2, strokes 202 and 204 comprise the symbol "x," e.g., a first subset, strokes 206 and 208 comprise the symbol "i," e.g., a second subset, and strokes 210 comprises the symbol "n," e.g., a third subset. In accordance with various embodiments of the present invention, the strokes that comprise a particular subset can be entered in any order. For example, stroke 204 can be input before stroke 202. However, in accordance with various embodiments, the subsets of the plurality of strokes defining a word are input in a particular input sequence. For example, with reference to strokes 202, 204, 206, 208 and 210, while strokes 202 and 204 can be input in any order, and likewise strokes 206 and 208 can be input in any order, in one embodiment, it is necessary that the first subset collectively be inputted prior to the second subset. In other words, while the strokes comprising the individual symbols "x," "i" and "n" can be inputted in any order, in order to properly recognize the word "xin" it is necessary to enter all the strokes for "x" prior to entering all the strokes for "i," and likewise to enter all the strokes for "i" prior to entering the stroke for "n."

In one embodiment, handwritten word recognition engine 105 is configured to determine a word based on the plurality of strokes without requiring recognition of the plurality of symbols, wherein a word is determined based at least in part on an entry sequence (e.g. temporal information) of subsets of the plurality of strokes. In other words, the strokes are collectively analyzed in determining the word, and the symbols comprising the word are not recognized individually. In one embodiment, the symbols are used to define the possible stroke input sequences defining a word.

In one embodiment, after preprocessing, the word feature vector of the plurality of strokes representing a word is inputted into statistical classifier 215 trained to identify the word.

Statistical classifier 215 is operable to perform classification among a pre-defined set of classes. Statistical classifier outputs scores reflecting the similarity between the preprocessed input signal and the output class. A high output score suggest acceptance of the associated tentative word while a low score suggests rejection of the associated hypothesis. In one embodiment, the output score indicates a probability that the strokes analyzed by the statistical classifier are a particular word from a dictionary of words. In another embodiment, the output score indicates a probability that the word feature vector analyzed by the statistical classifier is a particular word from a dictionary of words. It should be appreciated that statistical classifier 215 analyzes each combination of strokes with the respective word recognition as a whole, rather than individually analyzing each stroke.

In one embodiment, the plurality of strokes is inputted into statistical classifier 215 trained to identify the word. In one embodiment, handwritten word recognition engine 105 directs statistical classifier 215 to index an output of statistical classifier to dictionary 220 to determine the word. In one embodiment, the word is determined based at least in part on an entry sequence (e.g. temporal information) of the subsets of the plurality of strokes. It should be appreciated that handwritten word recognition engine 105 may include any number of dictionaries 220, an example of which is described in accordance with FIG. 4.

In one embodiment, dictionary 220 includes Pinyin representations of words. In another embodiment, dictionary 220 includes Bopomofo representations of words. In another embodiment, dictionary 220 includes Korean representations of words. In one embodiment the Korean representation of words includes Korean characters that are combinations of phonetic characters in two-dimensional space. In another embodiment, dictionary 220 includes phonetic representations of an ideographic language.

In one embodiment, dictionary 220 includes a predetermined limited set of words. In one embodiment, dictionary 220 includes an application-specific dictionary.

FIG. 3 is a flowchart illustrating a process 300 for recognizing handwritten words in accordance with an embodiment of the present invention. Although specific operations are disclosed in process 300, such steps are examples. That is, embodiments of the present invention are well-suited to performing various other operations or variations of the operations recited in process 300. The operations in process 300 may be performed in an order different than presented, and it is possible that not all of the operations in process 300 are performed. All of, or a portion of, the operations described by process 300 may be implemented using computer-readable and computer-executable instructions which reside, for example, in computer-usable media of a computer system. In one embodiment, process 300 is performed in an electronic device, e.g., electronic device 100 of FIG. 1A. In one embodiment, process 300 is performed at system 200 of FIG. 2. It should be appreciated that various operations have been left out of the following discussion for purposes of brevity and clarity At block 310 of process 300, a plurality of strokes is received at a common input region of an electronic device. The plurality of strokes in combination defines a word comprising a plurality of symbols, a relative geometry of a first subset of the plurality of strokes defines a first symbol and a relative geometry of a second subset of the plurality of strokes defines a second symbol such that the relative geometry of the first subset of the plurality of strokes is not related to the relative geometry of the second subset of the plurality of strokes, and at least one stroke of the first subset of the plurality of strokes is spatially superimposed over at least one stroke of the second subset of the plurality of strokes. In one embodiment, a symbol is defined independent of an entry sequence of the plurality of strokes.

In one embodiment, a relative geometry of a stroke includes a relative position and a proportional size of the stroke relative to other strokes of a symbol. In one embodiment, the relative position includes a relative horizontal position and a relative vertical position of the stroke relative to the other strokes of the symbol.

At block 320, the word is determined based on the plurality of strokes without requiring recognition of the plurality of symbols, wherein a word is determined based at least in part on an entry sequence of subsets of the plurality of strokes. In one embodiment, the word is determined using a processor of the electronic device.

In one embodiment, as shown at block 330, the plurality of strokes is inputted into a preprocessor. In one embodiment, as shown at block 340, the preprocessed plurality of strokes is inputted into a statistical classifier trained to identify the word.

In one embodiment, as shown at block 340, an output of the statistical classifier is indexed to at least one dictionary to determine the word. In one embodiment, the dictionary includes Pinyin representations of words. In another embodiment, the dictionary includes Bopomofo representations of words. In another embodiment, the dictionary includes Korean representations of words. In one embodiment the Korean representation of words includes Korean characters that are combinations of phonetic characters in two-dimensional space. In one embodiment, entry of stacked Korean phonetic characters will cause the statistical classifier to index a dictionary containing Korean characters. In another embodiment, entry of a stream of multiple Korean characters will cause the statistical classifier to index a dictionary containing Korean representation of words. In another embodiment, the dictionary includes phonetic representations of an ideographic language. In another embodiment, the dictionary includes a Pinyin-to-Ideogram lookup table.

In one embodiment, the dictionary includes a predetermined limited set of words. In one embodiment, the dictionary includes an application-specific dictionary.

Figure 4:
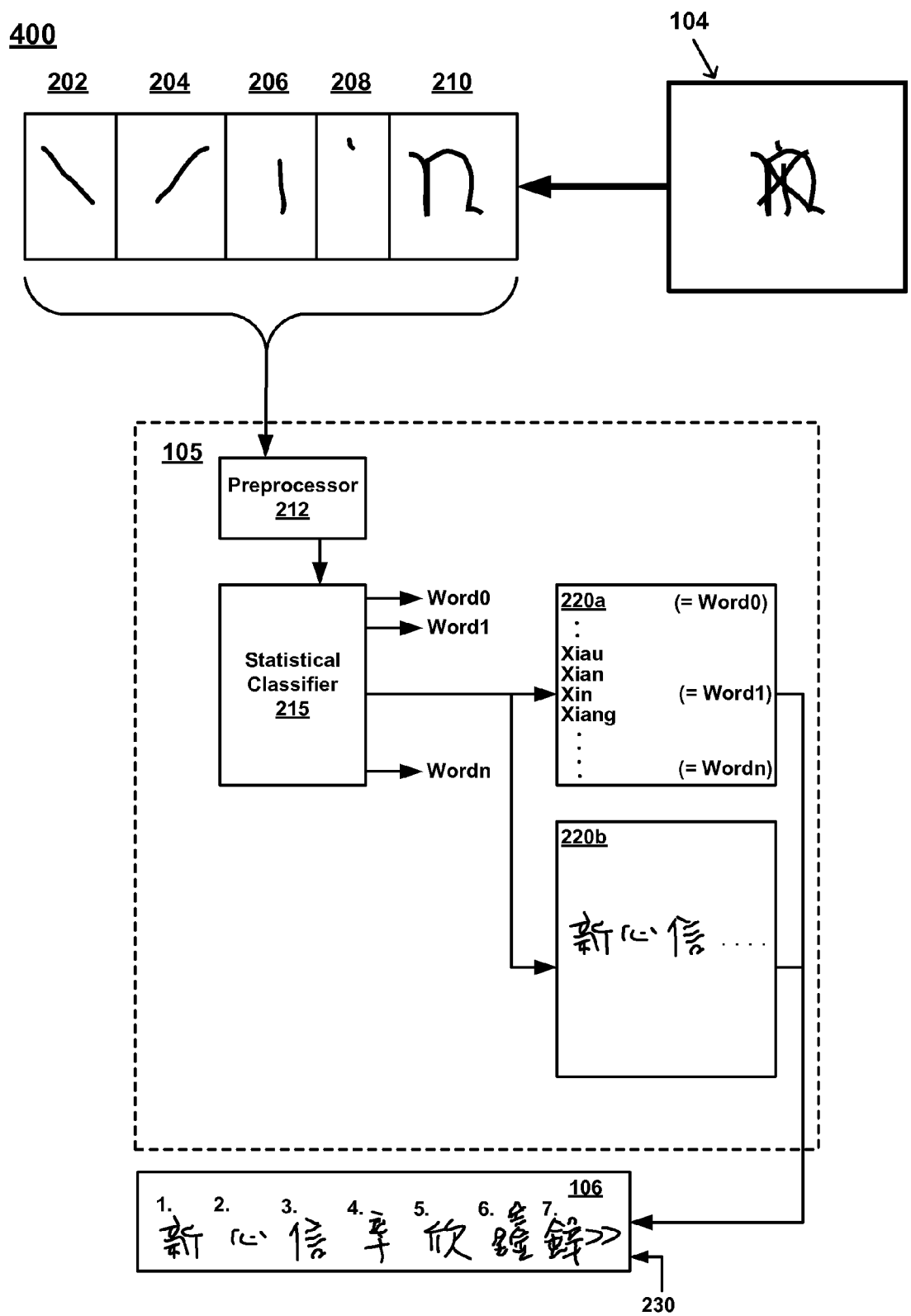
FIG. 4 is a block diagram showing components of an example handwritten word recognition engine, in accordance with another embodiment of the invention.

FIG. 4 is a block diagram showing components of a handwritten word recognition engine, in accordance with another embodiment of the invention. In one embodiment, the present invention provides a system 400 for performing handwritten word recognition based on text entry into a computer device (e.g., electronic device 100 of FIG. 1A) where the area allocated to text entry is small relative to the writing instrument. A user is able to enter strokes of symbols or a word in natural stroke order.

It should be appreciated that system 400 operates in a similar manner as system 200 of FIG. 2. For instance, handwriting input device 104 and preprocessor 212 operate as described in accordance with system 200, and details describing their operation are not repeated for purposes of brevity and clarity.

In one embodiment, handwritten word recognition engine 105 directs statistical classifier 215 to index an output of statistical classifier to dictionary 220a to determine the word. In one embodiment, dictionary 220a comprises Pinyin representations of the words. In one embodiment, the word is determined based at least in part on an entry sequence of the subsets of the plurality of strokes.

In another embodiment, a Chinese ideogram representation of the feature vector is determined by statistical classifier 215 indexing dictionary 220b. For example, the output of statistical classifier 215 is ranked based on the output scores. Statistical classifier 215 is then directed to index the highest ranking output of the statistical classifier to dictionary 225 to determine the word. The determined word is then displayed on the display device 106. In one embodiment, a list of candidate Chinese ideograms 230 is determined and displayed on display device 106 for user selection. In one embodiment, a Chinese ideogram representation of the plurality of strokes can be determined based on the same output from the statistical classifier 215 that is used to determine the Pinyin representation. In such an embodiment the handwritten word recognition engine 105 directs statistical classifier 215 to index an output of statistical classifier 215 to both Pinyin representation dictionary 220a and Chinese ideogram representation dictionary 220b. In one embodiment, both of the determined words from Pinyin representation dictionary 220a and Chinese ideogram representation dictionary 220b can be displayed by display device 106. In one embodiment, the output of Pinyin representation dictionary 220a can be used to train statistical classifier 215 to index the corresponding Chinese ideogram representation from Chinese ideogram representation dictionary 220b. In one embodiment, either the determined word using Pinyin representation dictionary 220a or Chinese ideogram representation dictionary 220b can be displayed on display device 106.

It should be appreciated that handwritten word recognition engine 105 is not limited to including a single dictionary, two dictionaries or to any number of dictionaries.

In one embodiment, dictionary 220a or 220b includes Pinyin representations of words. In another embodiment, dictionary 220a or 220b includes Bopomofo representations of words. In another embodiment, dictionary 220a or 220b includes Korean representations of words. In one embodiment the Korean representation of words includes Korean characters that are combinations of phonetic characters in two-dimensional space. In another embodiment, dictionary 220a or 220b includes phonetic representations of an ideographic language. In another embodiment, dictionary 220a or 220b includes English words or a subset of English words.

In one embodiment, dictionary 220a or 220b includes a predetermined limited set of words. In one embodiment, dictionary 220a or 220b includes an application-specific dictionary.

It should be appreciated that many types of statistical classifiers may be used, such as neural network devices, template matching devices, support vectors and the like. In one embodiment the neural network that is used is a time-delay neural network device.

FIG. 5 is a flowchart illustrating a process 500 for recognizing handwritten words in accordance with an embodiment of the present invention. Although specific operations are disclosed in process 500, such steps are examples. That is, embodiments of the present invention are well-suited to performing various other operations or variations of the operations recited in process 500. The operations in process 500 may be performed in an order different than presented, and it is possible that not all of the operations in process 500 are performed. All of, or a portion of, the operations described by process 500 may be implemented using computer-readable and computer-executable instructions which reside, for example, in computer-usable media of a computer system. In one embodiment, process 500 is performed in an electronic device, e.g., electronic device 100 of FIG. 1A. In one embodiment, process 500 is performed at system 400 of FIG. 4. It should be appreciated that various operations have been left out of the following discussion for purposes of brevity and clarity At block 510 of process 500, a plurality of strokes is received at a common input region of an electronic device. The plurality of strokes in combination defines a word comprising a plurality of symbols, a relative geometry of a first subset of the plurality of strokes defines a first symbol and a relative geometry of a second subset of the plurality of strokes defines a second symbol such that the relative geometry of the first subset of the plurality of strokes is not related to the relative geometry of the second subset of the plurality of strokes, and at least one stroke of the first subset of the plurality of strokes is spatially superimposed over at least one stroke of the second subset of the plurality of strokes. In one embodiment, a symbol is defined independent of an entry sequence of the plurality of strokes.

In one embodiment, a relative geometry of a stroke includes a relative position and a proportional size of the stroke relative to other strokes of a symbol. In one embodiment, the relative position includes a relative horizontal position and a relative vertical position of the stroke relative to the other strokes of the symbol.

At block 520, the Pinyin representation is determined by the corresponding output of the statistical classifier with the highest output score where the output scores indicate a probability that the word feature vector analyzed by the statistical classifier is a particular word from the Pinyin representation dictionary.

In one embodiment, as shown at block 530, the plurality of strokes are inputted into a preprocessor and transformed into a word feature vector.

In one embodiment, as shown at block 540, the transformed word feature vector is inputted to a statistical classifier trained to associate the transformed word feature vector with a target word in the Pinyin representation dictionary.

As shown at block 550, the candidate list of Chinese ideograms is also determined based on the same output of the statistical classifier trained to associate the Pinyin representation and the transformed feature vector of the input stroke sequence.

Various embodiments of the present invention, a method for recognizing handwritten words, are thus described. While the present invention has been described in particular embodiments, it should be appreciated that the present invention should not be construed as limited by such embodiments, but rather construed according to the below claims.

What is claimed is:

1. A computer-implemented method for recognizing handwritten words at an electronic device, said method comprising:
    receiving a plurality of strokes at a common input region of said electronic device, wherein said plurality of strokes in combination defines a word comprising a plurality of symbols, wherein a relative geometry of a first subset of said plurality of strokes defines a first symbol and a relative geometry of a second subset of said plurality of strokes defines a second symbol such that said relative geometry of said first subset of said plurality of strokes is not related to said relative geometry of said second subset of said plurality of strokes, and wherein at least one stroke of said first subset of said plurality of strokes is spatially superimposed over at least one stroke of said second subset of said plurality of strokes; and
    determining said word using a processor of said electronic device based on said plurality of strokes without requiring recognition of said plurality of symbols, wherein a word is determined based at least in part on an entry sequence of subsets of said plurality of strokes.

2. The computer-implemented method of claim 1 wherein said determining said word based on said plurality of strokes comprises:
    inputting said plurality of strokes into a statistical classifier trained to identify said word; and
    indexing an output of said statistical classifier to a dictionary determining said word.

3. The computer-implemented method of claim 1 wherein a relative geometry of a stroke comprises a relative position and a proportional size of said stroke relative to other strokes of a symbol.

4. The computer-implemented method of claim 1 wherein said relative position comprises a relative horizontal position and a relative vertical position of said stroke relative to said other strokes of said symbol.

5. The computer-implemented method of claim 2 wherein said wherein said dictionary is selected from a list consisting essentially of Pinyin representations of words, Bopomofo representations of words, and Korean representations of words.

6. The computer-implemented method of claim 2 wherein said dictionary comprises a predetermined limited set of words.

7. The computer-implemented method of claim 2 wherein said dictionary comprises an application-specific dictionary.

8. The computer-implemented method of claim 2 wherein said dictionary comprises phonetic representations of an ideographic language.

9. The computer-implemented method of claim 1 wherein a symbol is defined independent of an entry sequence of said plurality of strokes.

10. A non-transitory computer-readable medium having instructions encoded thereon for enabling a processor to perform a method for recognizing handwritten symbols, said method comprising:
    receiving a plurality of strokes at a common input region of an electronic device, wherein said plurality of strokes in combination defines a word comprising a plurality of symbols, wherein a relative geometry of a first subset of said plurality of strokes defines a first symbol and a relative geometry of a second subset of said plurality of strokes defines a second symbol such that said relative geometry of said first subset of said plurality of strokes is not related to said relative geometry of said second subset of said plurality of strokes, and wherein at least one stroke of said first subset of said plurality of strokes is spatially superimposed over at least one stroke of said second subset of said plurality of strokes; and
    determining said word based on said plurality of strokes without requiring recognition of said plurality of symbols, wherein a word is determined based at least in part on an entry sequence of subsets of said plurality of strokes.

11. The computer-readable medium of claim 10 wherein said determining said plurality of word based on said plurality of strokes comprises:
    inputting said plurality of strokes into a statistical classifier trained to identify said word; and
    indexing an output of said statistical classifier to a dictionary determining said word.

12. The computer-readable medium of claim 10 wherein a relative geometry of a stroke comprises a relative position and a proportional size of said stroke relative to other strokes of a symbol.

13. The computer-readable medium of claim 12 wherein said relative position comprises a relative horizontal position and a relative vertical position of said stroke relative to said other strokes of said symbol.

14. The computer-readable medium of claim 11 wherein said dictionary is selected from a list consisting essentially of Pinyin representations of words, Bopomofo representations of words, and Korean representations of words.

15. The computer-readable medium of claim 11 wherein said dictionary comprises phonetic representations of an ideographic language.

16. The computer-readable medium of claim 11 wherein said dictionary comprises a predetermined limited set of words.

17. The computer-readable medium of claim 11 wherein said dictionary comprises an application-specific dictionary.

18. An electronic device comprising:
a processor;
a memory communicatively coupled to said processor; and
a common input region communicatively coupled to said processor and for receiving a plurality of strokes, wherein said plurality of strokes in combination define a symbol comprising a plurality of subset characters, wherein a relative geometry of a first subset of said plurality of strokes defines a first symbol and a relative geometry of a second subset of said plurality of strokes defines a second symbol such that said relative geometry of said first subset of said plurality of strokes is not related to said relative geometry of said second subset of said plurality of strokes, and wherein at least one stroke of said first subset of said plurality of strokes is spatially superimposed over at least one stroke of said second subset of said plurality of strokes;
wherein said processor is configured to determine said word based on said plurality of strokes without requiring recognition of said plurality of symbols, is configured to input said plurality of strokes into a statistical classifier trained to identify said word, and configured to index an output of said statistical classifier to a dictionary determining said word, wherein a word is determined based at least in part on an entry sequence of subsets of said plurality of strokes.

19. The electronic device of claim 18 wherein a relative geometry of a stroke comprises a relative position and a proportional size of said stroke relative to other strokes of a symbol.

20. The electronic device of claim 19 wherein said relative position comprises a relative horizontal position and a relative vertical position of said stroke relative to said other strokes of said symbol.

21. The electronic device of claim 18 wherein said dictionary is selected from a list consisting essentially of Pinyin representations of words, Bopomofo representations of words, Korean representations of words, and phonetic representations of an ideographic language.

22. The electronic device of claim 18 wherein said dictionary comprises a predetermined limited set of words.

23. The electronic device of claim 18 wherein said dictionary comprises an application-specific dictionary.

* * * * *